(No Model.)

O. VANORMAN.
WHIFFLETREE COUPLING.

No. 295,601. Patented Mar. 25, 1884.

WITNESSES
F. L. Ourand
E. G. Siggers

INVENTOR
Oliver Vanorman
by C. A. Snow & Co
Attorneys

United States Patent Office.

OLIVER VANORMAN, OF RACINE, WISCONSIN, ASSIGNOR OF ONE-HALF TO W. H. JOHNSON, OF SAME PLACE.

WHIFFLETREE-COUPLING.

SPECIFICATION forming part of Letters Patent No. 295,601, dated March 25, 1884.

Application filed December 17, 1883. (No model.)

*To all whom it may concern:*

Be it known that I, OLIVER VANORMAN, a citizen of the United States, residing at Racine, in the county of Racine and State of Wisconsin, have invented a new and useful Whiffletree, of which the following is a specification, reference being had to the accompanying drawings.

My invention relates to whiffletree-irons, and particularly to that class shown and described in Letters Patent granted to me June 19, 1883, No. 279,846, the object being to simplify and improve the details of construction of the same.

With these ends in view the invention consists in the improved construction and combinations of parts, hereinafter fully described, and pointed out in the claim.

Figure 1:
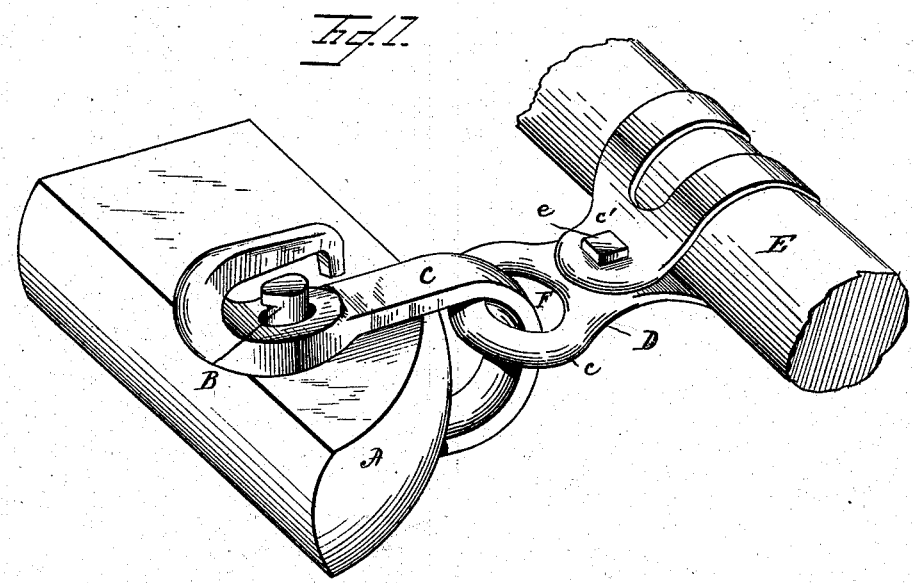
Figure 2:
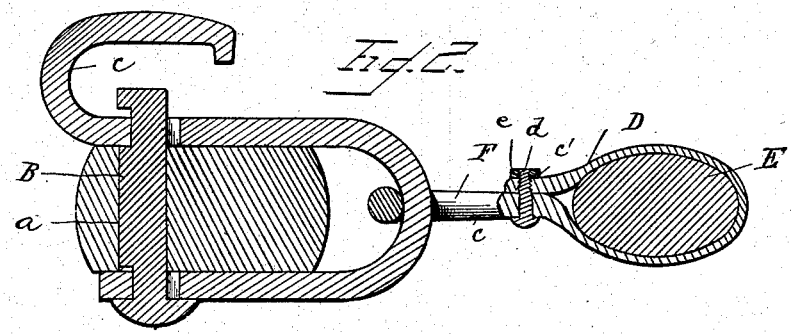
Figure 3:
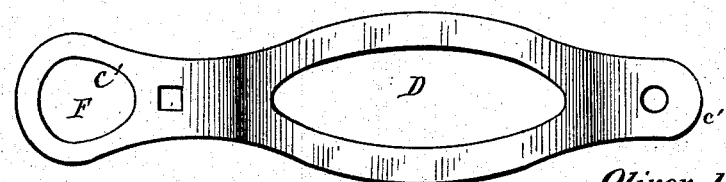

In the drawings, Figure 1 is a perspective view of my improvement applied to a portion of a whiffletree and connected with a portion of a double-tree. Fig. 2 is a vertical section of the same. Fig. 3 is a plan view of the coupling-iron detached.

A represents the double-tree, having the feathered opening $a$ to receive a feathered bolt, B, which connects the bail or loop C to the said double-tree.

D represents my improved coupling-iron, which embraces the central portion of the whiffletree E, and is connected to the bail or loop C of the double-tree A. This coupling-iron is usually a malleable casting, but may be wrought, if so desired, and is preferably of the form shown in Fig. 3, and consists of the central portion, D, which is curved or bent near its ends to conform to the shape of the whiffletree when it is bent around the latter. The said iron is provided at its ends with extensions $c\ c'$, the extension $c$ having an eye or loop, F, projecting therefrom, which embraces or connects the said coupling-iron with the bail or loop C. There are perforations or openings formed in the extensions $c\ c'$ to receive a bolt, $d$, provided with a screw-threaded end to receive a nut, $e$, by which means the coupling-iron is secured around the whiffletree.

From the foregoing it will be apparent that the device above described is very simple in its construction, and may be manufactured at a slight cost, and affords ready and durable means for connecting the whiffletree and the double-tree.

Having fully described my invention, what I claim as new, and desire to secure by Letters Patent, is—

The combination, with a single-tree and a double-tree, of a coupling-iron constructed of a single piece of metal and provided at one of its ends with a loop, said coupling-iron being also formed with perforations to receive a bolt or equivalent fastening, and a bail connected to the loop of said coupling-iron and secured to the double-tree by a bolt, the upper end of said bail being bent upwardly and then rearwardly to form a hook, substantially as set forth.

In testimony that I claim the foregoing as my own I have hereto affixed my signature in presence of two witnesses.

OLIVER VANORMAN.

Witnesses:
W. H. JOHNSON,
L. D. MILLER.